United States Patent [19]

Thorn

[11] Patent Number: 4,850,168
[45] Date of Patent: Jul. 25, 1989

[54] FRAME ASSEMBLY FOR DOORS, WINDOWS AND THE LIKE

[75] Inventor: John E. Thorn, Sylvania, Ohio

[73] Assignee: Therma-Tru Corp., Toledo, Ohio

[21] Appl. No.: 247,407

[22] Filed: Sep. 21, 1988

[51] Int. Cl.$^4$ ............................ E06B 3/30; E06B 3/36
[52] U.S. Cl. ...................................... 52/207; 52/206; 52/455; 52/80; 49/501
[58] Field of Search ................ 52/455, 207, 208, 656, 52/802, 805, 477; 49/501

[56] References Cited

U.S. PATENT DOCUMENTS

| | | |
|---|---|---|
| 2,849,758 | 9/1958 | Plumley et al. |
| 2,871,056 | 1/1959 | Levitt |
| 2,890,977 | 6/1959 | Bayer et al. |
| 2,924,860 | 2/1960 | Parham, Jr. et al. |
| 3,153,817 | 10/1964 | Pease, Jr. |
| 3,225,505 | 12/1965 | Lytz |
| 3,250,004 | 5/1966 | Anger ........................................ 49/501 |
| 3,299,595 | 1/1967 | Munk ........................................ 52/309.1 |
| 3,402,520 | 9/1968 | Lee et al. ................................ 52/309.6 |
| 3,498,001 | 3/1970 | MacDonald ............................ 49/501 |
| 3,512,304 | 5/1970 | Meuret .................................... 49/501 |
| 3,546,841 | 12/1970 | Smith et al. ........................... 52/309.1 |
| 3,593,479 | 7/1971 | Hinds ...................................... 52/313 |
| 3,772,241 | 11/1973 | Kroekel |
| 3,883,612 | 5/1975 | Pratt et al. |
| 3,950,894 | 4/1976 | DiMaio .................................... 49/501 |
| 3,961,012 | 6/1976 | DiMaio .................................... 264/257 |
| 4,132,042 | 1/1979 | DiMaio .................................... 52/309.1 |
| 4,152,876 | 5/1979 | Seely ........................................ 52/455 |
| 4,265,067 | 5/1981 | Palmer ...................................... 52/309.9 |
| 4,496,201 | 1/1985 | Allgeyer .................................. 49/501 |
| 4,550,540 | 11/1985 | Thorn ...................................... 52/309.4 |
| 4,720,951 | 1/1988 | Thorn ...................................... 52/455 |

FOREIGN PATENT DOCUMENTS

| | | |
|---|---|---|
| 898855 | 5/1984 | Belgium . |
| 2304763 | 10/1976 | France . |
| 604937 | 4/1978 | U.S.S.R. . |
| 1420244 | 1/1976 | United Kingdom . |
| 1487309 | 9/1977 | United Kingdom . |
| 2044316 | 10/1980 | United Kingdom . |

Primary Examiner—James L. Ridgill, Jr.
Attorney, Agent, or Firm—Emch, Schaffer, Schaub & Porcello Co.

[57] ABSTRACT

Improved frame assembly for doors, windows and the like is provided. The assembly includes a frame defining an opening for receiving and retaining a central panel. The frame is formed from two joined skins which may be molded in the same mold and which are provided with inwardly extending flanges having notched areas on opposite sides of the flanges such that the skins can be joined together to form a lap joint on the exterior edge and to seal a central panel in the opening. Foamable insulating material is provided as a core between the two skins with a separate sealant material provided to seal the central panel. Passage means are provided for introducing the sealant material and the insulating material.

26 Claims, 7 Drawing Sheets

FRAME ASSEMBLY FOR DOORS, WINDOWS AND THE LIKE

BACKGROUND OF THE INVENTION

The present invention relates to an improved frame assembly for doors, windows and the like having opposed inner and outer skins with foam core material between the skins and a central panel, preferably a glass central panel. In its preferred embodiment, the present invention provides for a plurality of glass panels to obtain an enhanced insulating effect, and to a construction providing for an enhanced seal between the central panel and the skins holding the central panel in place. It also provides a frame assembly in which the opposed inner and outer skins are of similar construction such that both the inner and outer skins may be molded in the same mold.

There has been an increased demand for fabricated window and door frames with improved weather and thermal characteristics and increased durability. Doors and windows that are all wood tend to rot with time and prolonged exposure to the elements. Wood also exhibits a high degree of expansion and contraction which makes sizing and operation of the assembly difficult. Both wood and metal frames are also poor insulators when compared to certain plastics, foams and glass reinforced resin products. The seal between the frame and the framed material is also important to an efficient high quality door or window frame assembly. Poor seals provide inferior vapor barriers between the interior and exterior of the frame. In multiple pane windows and doors a poor seal will allow moisture to infiltrate into the spaces between the panes and condense which reduces the thermal efficiency of the assembly and makes it aesthetically unpleasing.

It is an object of the present invention to provide a door and window frame assembly which is relatively lightweight and thermally efficient.

A prior frame assembly for doors and windows is disclosed in U.S. Pat. No. 4,720,951, of which I am a co-inventor. Under the invention disclosed in that patent, the frame assembly includes a first skin and a second skin in opposed relationship with each other and having a cavity defined therebetween in which a foamable insulating material is placed. The foamable insulating material fills the cavity and surrounds the edge of the central panel to form a weather resistant seal between the frame and the edge of the central panel, which central panel will frequently be multiple panes of glass.

Under the present invention, the construction is such as to provide a sealing chamber for the central panel separate from the cavity containing the foamable insulating material thereby permitting utilization of a separate sealing material for sealing the central panel than is used for the insulating core between the two skins.

Accordingly, it is a further object of this invention to provide a frame assembly having an excellent seal between the central panel and the frame while still permitting the utilization of thermally efficient core material for use between the skins.

It is desirable that the frame assemblies simulate the appearance of wood. My U.S. Pat. No. 4,550,540 describes a compression molded door assembly with a foam core which simulates wood. The molds for forming compression molded skins having a wood appearance similar to the texture and graining of a wood door are extremely expensive to manufacture. The design of my new frame assembly for doors and windows is such as to permit a single mold to be used for producing both the inner skin and the outer skin while still permitting both interior and exterior surfaces of the doors and windows to have an appearance simulating wood.

It is, therefore, an object of the present invention to provide a door and window frame assembly in which the inner and outer skins have a configuration sufficiently similar to permit them to be molded in the same mold.

It is a further object of the present invention to provide a door and window frame assembly having such similar inner and outer skins which will readily accept different thicknesses of glass as well as single or multiple paned glass, including two or three panes for the central panel portion.

It is another object of the present invention to provide a frame assembly for doors, windows and the like in which the central panel portion, whether it be single or multiple panes of glass or other material, is effectively sealed in the frame and which permits such effective seal to be made using inner and outer skins for the frame which were manufactured on the same mold and in so doing to keep the sealant for the central panel separate from the foam insulating material in the cavity defined by the first and second skins.

Other objects and advantages of the present invention will become apparent from a further review of the following specification, drawings and claims.

SUMMARY OF THE INVENTION

The present invention relates to an improved frame assembly for doors, windows and the like. The assembly comprises of a central panel, such as a glass panel in single or multiple plies and a frame. The frame defines an opening for receiving the panel. The frame includes a first skin and a second skin having either identical configurations or configurations sufficiently similar to permit each to be molded in the same mold. Each of the skins has an interior and an exterior edge with the respective exterior edges having inwardly facing flanges terminating at their free ends with notched areas of reduced thickness which are joined together to form a lap joint securing the exterior edges of the skins together. The interior edges define an opening for a central panel. Each of the skins also has second flanges spaced exteriorly of the interior edge and extending inwardly toward the opposite skin to form a butt joint. A cavity is defined between the first and second skins with the joined inwardly facing flanges which form the lap joint and the butt joint forming the edges of such cavity. Foamable insulating material fills the cavity. The edge of the central panel extends between the interior edges of said first and second skins to the wall formed by the abutting second flanges. A sealant such as polyisobutylene is used to seal the central panel in the gap between the interior edge portions of the joined skins. Channel means extending from the exterior edges of the joined skins to and through the wall formed by the abutting second flanges are provided for the introduction of the sealant for the central panel.

DESCRIPTION OF THE PREFERRED EMBODIMENT

Figure 1:
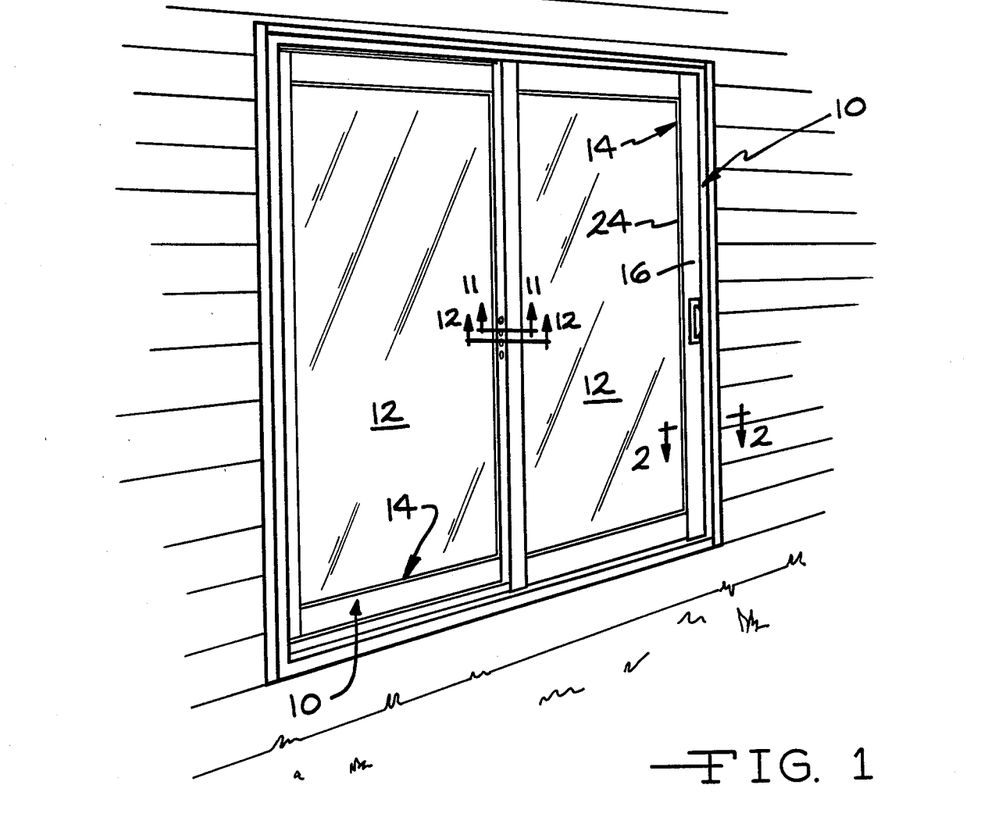
FIG. 1 is a perspective view of a door frame assembly according to the present invention.
Figure 2:
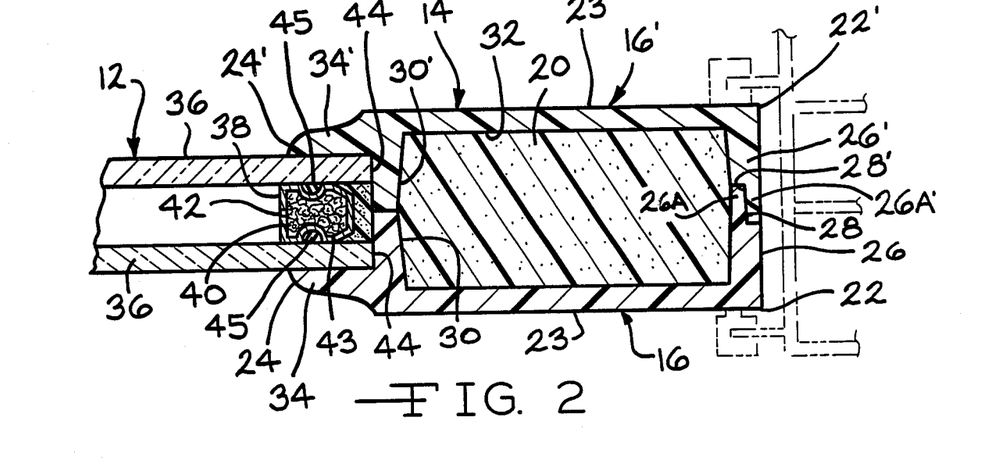
FIG. 2 is a partial sectional view taken through line 2—2 of FIG. 1.
Figure 3:
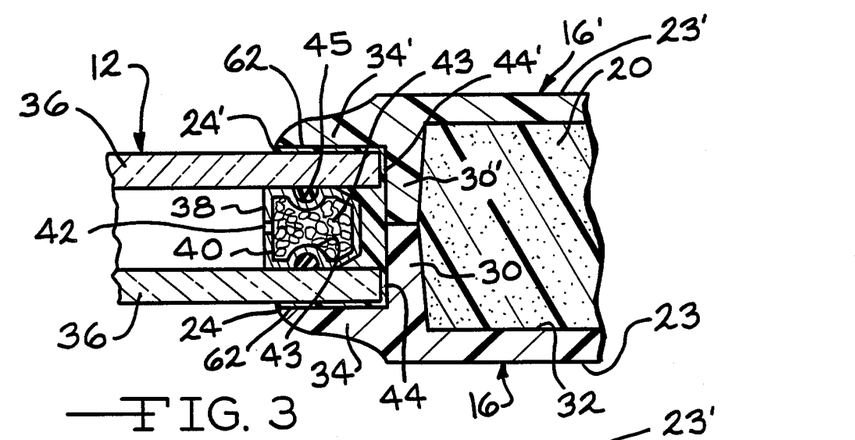
FIG. 3 is an enlarged sectional view of a portion of the section shown in FIG. 2 showing the seal between the central panel and the frame.
Figure 4:
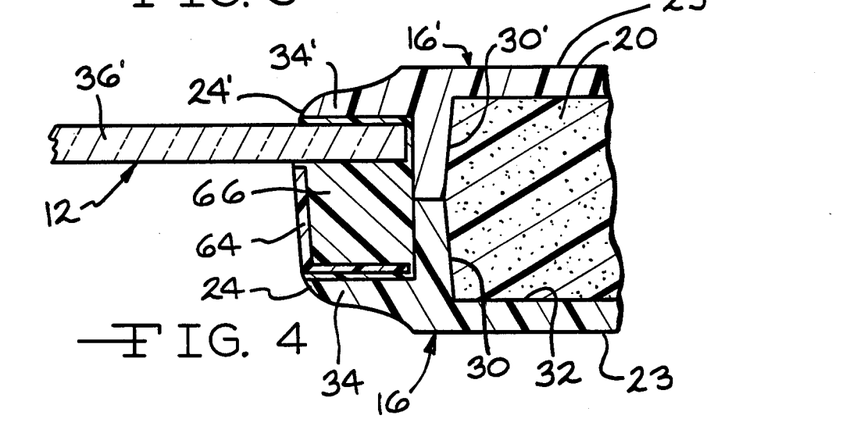
FIG. 4 is a view similar to FIG. 3 showing an assembled door frame assembly having a single pane of glass for the central panel.
Figure 5:
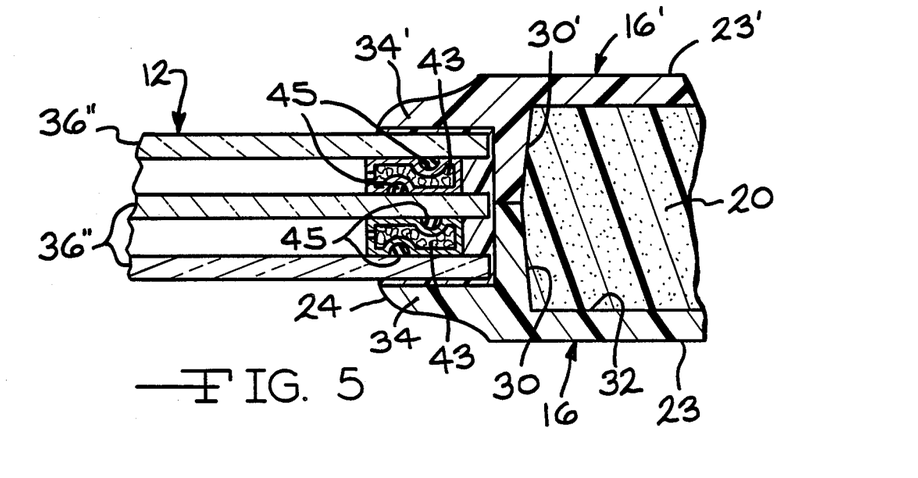
FIG. 5 is a view similar to FIGS. 3 and 4 showing an assembled door frame assembly having three panes of glass for the central panel.

An assembled door frame assembly embodying the present invention is shown in FIG. 1. In FIG. 1 there is shown a pair of patio doors which are designed to replace a sliding glass door as is commonly found in residential housing, each of which is a door frame assembly 10. The claimed assembly can also be adapted for use in window construction, for example as shown in FIG. 2 of U.S. Pat. No. 4,720,951 of which I am a co-inventor. The frame assembly 10 comprises a central panel 12 of glass or other material and a sash frame 14. If glass is used for the central panel 12, it can be a single pane as shown in FIG. 4, double panes as shown in FIGS. 2 and 3 or triple panes as shown in FIG. 5. The overall shape of the frame assembly 10 can be varied to accomodate a wide variety of structural designs.

Referring to FIGS. 2 and 3, the frame 14 consists of a first outer skin 16, a second inner skin 16' and an insulating core 20 of foamed plastic such as polyurethane. Preferably each of the skins 16 and 16' is compression molded from a sheet molding compound to provide a molded wood grain texture as disclosed in my U.S. Pat. No. 4,550,540.

As molded, the first skin 16 and second skin 16' are identical and, therefore, can be molded in the same mold. The ability to mold both skins in the same mold is a significant feature of the present invention as the molds for forming such skins are very expensive, costing on the order of $100,000 for a mold for the skin for a patio door assembly having a texture and appearance simulating that of wood. As will be appreciated, such construction permits economies in manufacture of such door and window frame assemblies while still permitting both the interior and exterior of such frame assemblies to have the appearance and texture of wood.

Figure 6:
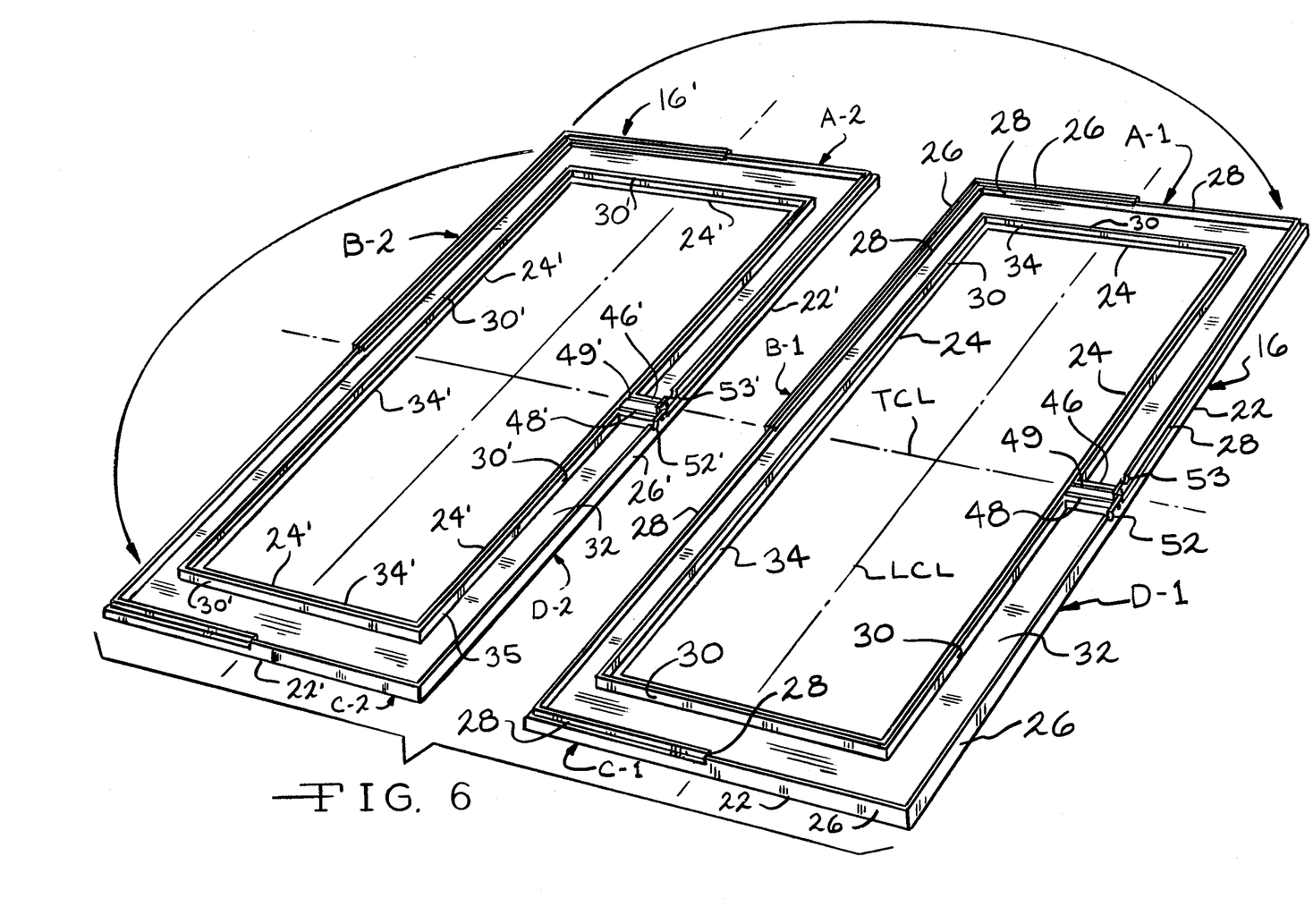
FIG. 6 is a perspective view showing two skins following molding in the same mold and showing schematically the orientational movement of one skin relative to the other prior to assembling them together.

Referring to FIGS. 2, 3, 6 and 7, each of the skins 16 and 16' includes an exterior edge 22, 22' defining the outer periphery, a panel portion 23, 23' and an interior edge 24, 24' defining an opening within which the central panel 12 is located. The exterior edge 22, 22' includes an inwardly extending flange 26, 26'. As can be seen particularly in FIGS. 2, 6 and 7, each of the flanges 26, 26' has a notch 28 and 28' at its free end so that the end portions 26A and 26A' are of reduced thickness and may be joined together as shown in FIG. 2 to provide a lap joint, the overall thickness of which is about the same as the main portion of the flanges 26, 26'. The notches 28, 28' are on the exterior side of the respective flanges 26, 26' for one-half of the periphery and on the interior side of the respective flanges 26, 26' for the remainder of the periphery. This can be seen by labeling the four sides of the first skin 16 as A-1, B-1, C-1 and D-1 and the four sides of the second skin 16' as A-2, B-2, C-2 and D-2 and by showing the longitudinal centerline LCL and transverse centerline TCL. As shown in FIG. 6, the notch 28 is on the exterior side of flange 26 from the center of side D-1 to the center of side A-1 and from the center of side B-1 to the center of side C-1. The notch 28 is on the interior side of flange 26 for the remainder of its periphery, namely, from the center of side A-1 to the center of side B-1 and from the center of side C-1 to the center of side D-1.

Each of the skins 16, 16' is provided with a second flange 30, 30' which extends inwardly toward the opposing skin. The respective second flanges 30, 30'are close to but spaced from the respective interior edges 24, 24'. The respective second flanges 30, 30' form a butt joint when the first and second skins 16, 16' are joined together and cooperate with the joined inwardly extending flanges 26, 26' and the opposing panel portions 23, 23' of the first and second skins to define a cavity 32 in which foamed polyurethane insulating core 20 may be introduced. A suitable adhesive such as thermosetting contact adhesives may be utilized for adhering the flanges 26, 26' together.

Each of the skins 16, 16' has a lip 34, 34' extending between the second flange 30, 30' and the interior edge 24, 24'. Preferably the lip 34, 34' is contoured to closely resemble the contour of a wood door including the quarter round portion thereof. As can be seen in FIGS. 2 and 3, the respective lips 34 and 34' are spaced apart from one another to form a gap in which the peripheral edge of the central panel 12 is positioned.

In the embodiment shown in FIGS. 2 and 3, the central panel 12 comprises two panes of glass 36 which are spaced apart in substantially parallel relationship. Positioned between the spaced apart panes of glass 36 is a dessicant holder 38 which may be formed of extruded aluminum and which holds a dessicant material 40 and is provided with a slot 42 which provides communication between the dessicant material 40 and the space between the two glass panes 36. The dessicant holder 38 is spaced from the outer edges 44 of the glass panes 36 in a position to be clamped between the the panes 36 when the outer edges of such panes are clamped between the lips 34, 34' of the first and second skins 16, 16'. The dessicant holder 38 is provided with two grooves 43, one facing each pane of glass 36. Positioned in each of the grooves 43 is a sealing strip 45 of rubber or similar sealing material each of which is compressed against the inner surfaces of the respective glass panes 36 when such panes are clamped between the lips 34, 34', such sealing strip 45 thereby assisting to prevent moisture from entering the space between such panes 36. The gap between the dessicant holder 38 and the wall formed by the abutting second flanges 30, 30' is filled with polyisobutylene or other suitable sealant material such as a silicone to firmly adhere the panes 36, the dessicant holder 38 and skins in that area together.

Figure 7:
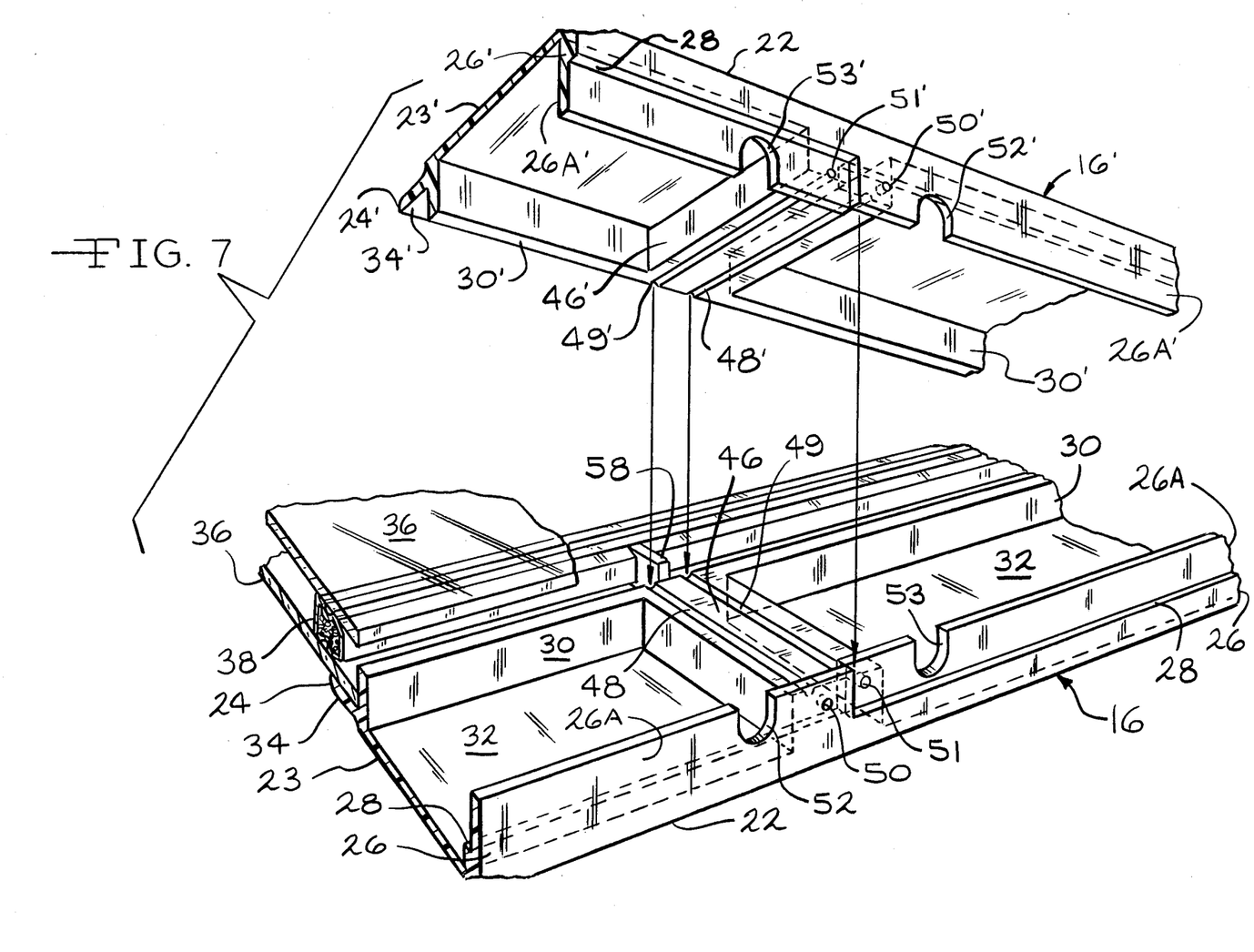
FIG. 7 is a perspective view showing fragments of the upper and lower skins following orientation and immediately prior to being joined together.
Figures 8, 9, 10:
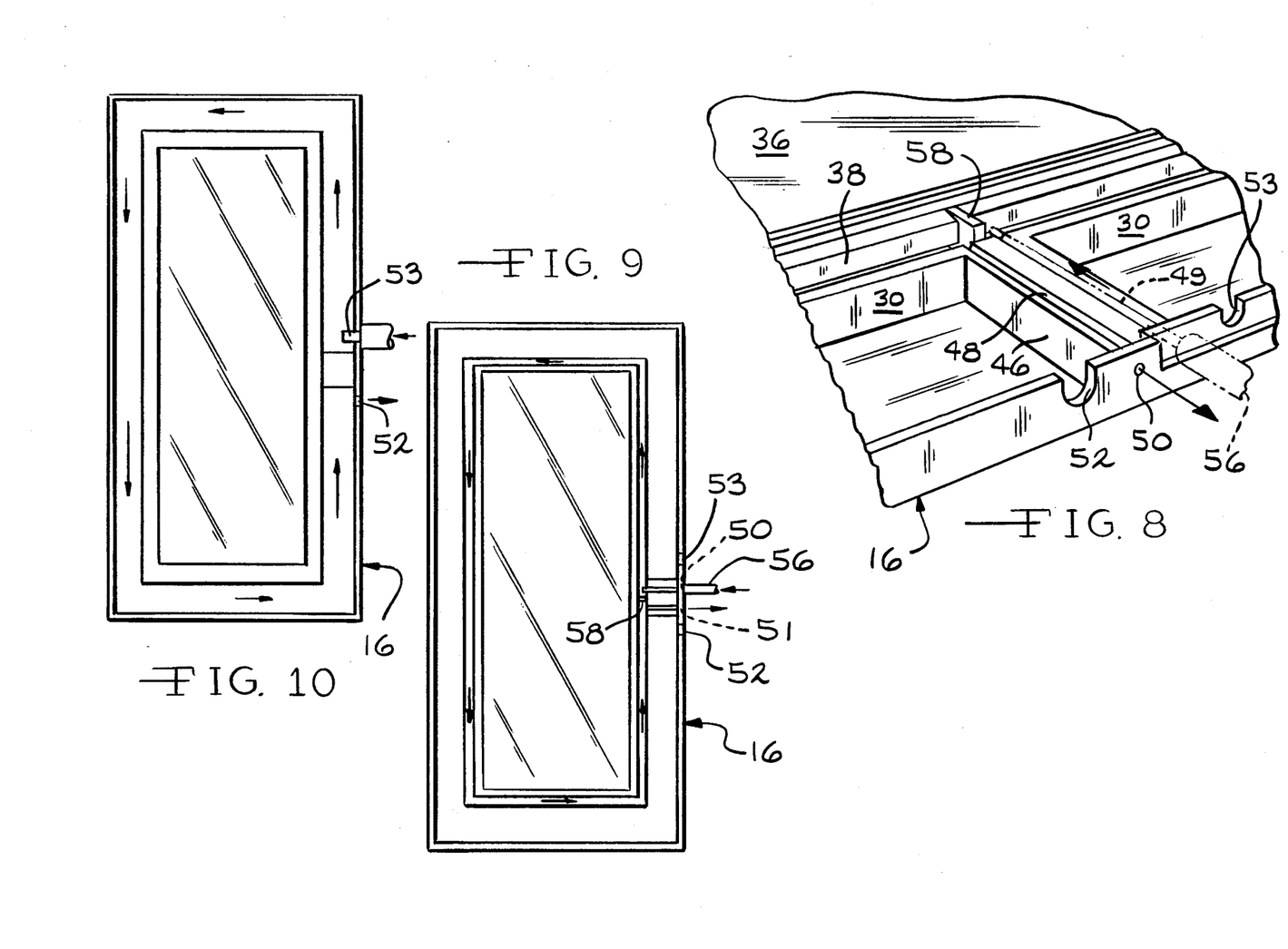
FIG. 8 is a fragmentary perspective view of a portion of the lower skin showing the means for introducing sealant to seal the central panel.
FIG. 9 is a schematic elevational view of the door frame assembly with one of the skins removed showing the flow path of the sealant for sealing the central panel.
FIG. 10 is a schematic elevational view of the door frame assembly with one of the skins removed showing the means for introducing foam into the cavity defined by the two skins and the flow path followed by such foam.

Referring now to FIGS. 6, 7 and 8, means are molded in the respective skins 16, 16' for permitting the introduction of the polyisobutylene or other sealant into the gap between the glass panes 36, the dessicant holder 38 and the wall formed by the abutting second flanges 30, 30'.

Each of the skins 16, 16' has molded therein a lateral wall 46, 46' which extends from the inwardly extending flange 26, 26' to the second flange 30, 30'. The center of each of the lateral walls 46 and 46' is on the transverse center line TCL. When the respective skins 16, 16' are joined together, the lateral walls 46, 46' abut one another and form a dam extending across the cavity 32. As will be appreciated, the height of the lateral walls 46, 46' is the same as the height of the second flanges 30, 30' so that each of the respective second flanges 30, 30'and lateral walls 46, 46' are joined in abutting relationship with the corresponding member from the opposed skin when the skins 16, 16' are joined together. This is in contrast to the inwardly extending flanges 26, 26' at the exterior edges 22, 22' which form a lap joint with one another and, therefore, extend beyond the plane formed by the respective abutting ends of the second flanges 30, 30' and lateral walls 46, 46'.

Figures 11, 12, 13:
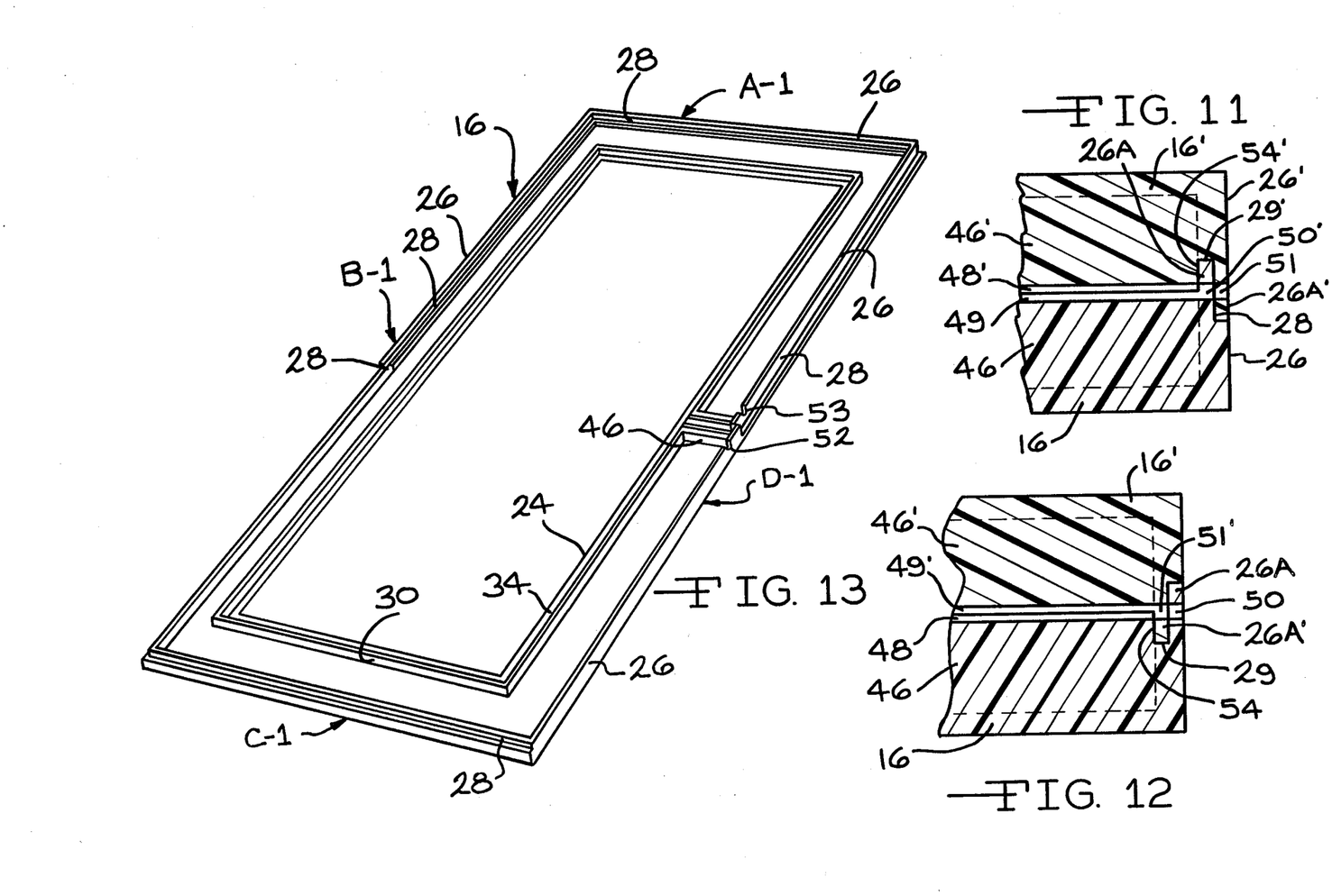
FIG. 11 is a fragmentary sectional view of one frame assembly taken through line 11—11 of FIG. 1.
FIG. 12 is a fragmentary sectional view of the same frame assembly as FIG. 11 taken through line 12—12 of FIG. 1.
FIGS. 13 and 14 are perspective views of skins having a modified construction suitable for use in a frame assembly of the present invention.

As can be seen particularly in FIGS. 11 and 12, the respective wall portions 46, 46' adjacent the notch 28, 28' is itself provided with a notched area 54, 54'. The purpose of such notched areas 54, 54' is to permit the skins 16, 16' to be fully joined together with the overlapping ends 26A, 26A' of the inwardly extending flanges 26, 26' extending into the notched areas 54, 54', thus, ensuring that there is no interference when the skins 16, 16' are joined together.

Each of the lateral walls 46, 46' is provided with a pair of semi-circular grooves 48, 48' and 49, 49'. Each of the sets of grooves 48, 48' and 49, 49' are on opposite sides of their respective transverse centerlines TCL and spaced equidistant therefrom. Each of the inwardly extending flanges 26, 26' is provided with a first aperture 50, 50' aligned respectively with the first set of grooves 48, 48' and a second aperture 51, 51' aligned respectively with the second set of grooves 49, 49'.

In order to join together the first and second skins 16, 16' having the above described construction, it is necessary that one of the skins be turned end to end before folding over and engaging the other skin. Thus, referring to FIG. 6, with the first skin 16 remaining in the position shown in FIG. 6, with side A-1 at the top and C-1 at the bottom, then the second skin 16' should be turned end to end so that the side A-2 is then in the position previously occupied by the side C-2. The result of this will be that side D-2 will be in the position previously occupied by the side B-2. Then, when the second skin 16' is folded over or rotated about the longitudinal axis LCL, the sides will be positioned such that the side D-2 may be joined to the side D-1, side B-2 joined to side B-1, side A-2 joined to side C-1 and side C-2 joined to side A-1. With this orientation of the first and second skins 16 and 16' and with the specific construction of the skins as herein described, the skins may be joined together with the central panel therebetween to form a partially completed frame assembly. Referring to FIGS. 6 and 7, it will be appreciated that as a result of such orientation of the second skin 16', aperture 50 will be aligned with aperture 51', groove 48 will be aligned with groove 49', aperture 51 will be aligned with aperture 50' and groove 49 will be aligned with groove 48'. Thus, when the first and second skins 16, 16' are joined together there will be provided an inlet passageway defined by the respective aligned apertures 51, 50' and aligned grooves 49 and 48' and an outlet passageway defined by the respective aligned apertures 50, 51' and grooves 48 and 49'. Such passageways communicate with the gap between the glass panes 36, the dessicant holder 38 and the interior surface of the abutting second flanges 30, 30'.

There is also provided in each of the inwardly extending flanges 26, 26' a first cutout 52, 52' positioned on one side of the lateral wall 46 and a second cutout 53, 53' on the opposite side of the lateral wall 46. The respective sets of cutouts 52, 52' and 53, 53' are each spaced the same distance from the transverse centerline TCL so that when the respective skins are reversed as previously described, the respective cutouts will align with one another to form an aperture which communicates with the cavity 32 to permit the introduction of foamable insulating material into such cavity 32. As will be appreciated, cutout 52 will be aligned with cutout 53' and cutout 53 will be aligned with cutout 52' due to the end to end turning of the skin 16'.

Referring specifically to FIGS. 3, 6, 7, 8 and 9, there is shown schematically means for introducing the polyisobutylene or other suitable sealant into the gap between the dessicant holder 38 and the wall formed by the abutting second flanges 30, 30'. Although, for purposes of clarity, the figures show only one of the skins 16, it is obvious that the two skins 16, 16' will be joined together prior to introduction of such sealant.

A nozzle 56 may be introduced through the passageway formed by the aligned apertures 51, 50' and grooves 49, 48'. Prior to joining the first and second skins 16, 16' together, an insert 58 is positioned and adhered between the edge of the dessicant holder 38 and the wall formed by the abutting second flanges 30, 30' in a position between the passageways 48, 48' and 49, 49'. Such insert 58 prevents the polyisobutylene sealant from prematurely flowing out of the outlet passageway and ensures that such sealant will flow completely around the periphery of the dessicant holder 38 so that when it flows out of the outlet passageway 48, 49' and 50, 51' it will have completely sealed the central panel between the lips 34 and 34'. As may be appreciated, considerable pressure will be required to flow such sealant material around such periphery. Such pressurized introduction of sealant material will cause small portions of the sealant to flow or wick between the outer edges 44, 44' of the glass panels as shown in FIG. 3 and between the end outer surfaces of the glass panel 62, 62' in FIG. 3 thus ensuring a complete seal between the central panel and the first and second skins 16, 16'. Some of such sealant will also wick between the abutting edges of the respective second flanges 30 and 30' thereby firmly joining them together.

After introduction of the polyisobutylene sealant, the inlet and outlet apertures may be sealed with a material providing an appearance similar to the rest of the outer edge of the frame assembly. Thereafter, a foamable insulating material such as foamed polyurethane may be introduced into the aperture formed by the cutouts 53, 52', flowed through the cavity 32 and out of the aperture formed by the cutouts 52, 53'. Following such introduction of the foamable polyurethane, the respective apertures may be filled with material simulating the remainder of the door edge of the door assembly.

An alternative embodiment is shown in FIG. 13. Since the panels are identical as molded, only one is shown. In this embodiment, the flange 26 at the end A-1 of the skin 16 is molded with the notch 28 solely on the interior surface and the flange 26 at the end C-1 is molded with the notch 28 solely on the exterior surface of such flange. Thus, since the end A-2 of the second skin 16' will be mated with the end C-1 of the first skin 16, it is not necessary that the notch be divided at the centerline but rather only necessary that it be formed in one surface of the flange 26 at the end A-1 and in the opposite surface of the flange 26 for the mating end C-2 and vice versa for the mating flanges for the ends C-1 and A-2. In this embodiment, the flanges 26 along sides B-1, B-2 and D-1, D-2 have their respective notches 28 formed as in the previous embodiment, namely, on the exterior surface of the flange 26 along side D-1 from its center to the end A-1 and on the interior surface of flange 26 from its center to the end C-1 while the side B-1 has the notches 28 on the interior surface of the flange 26 from its center to the end A-1 and on the exterior surface from its center to the end C-1. Since the second skin 16' is molded with an identical configuration, it is not necessary to repeat the description.

Figure 14:
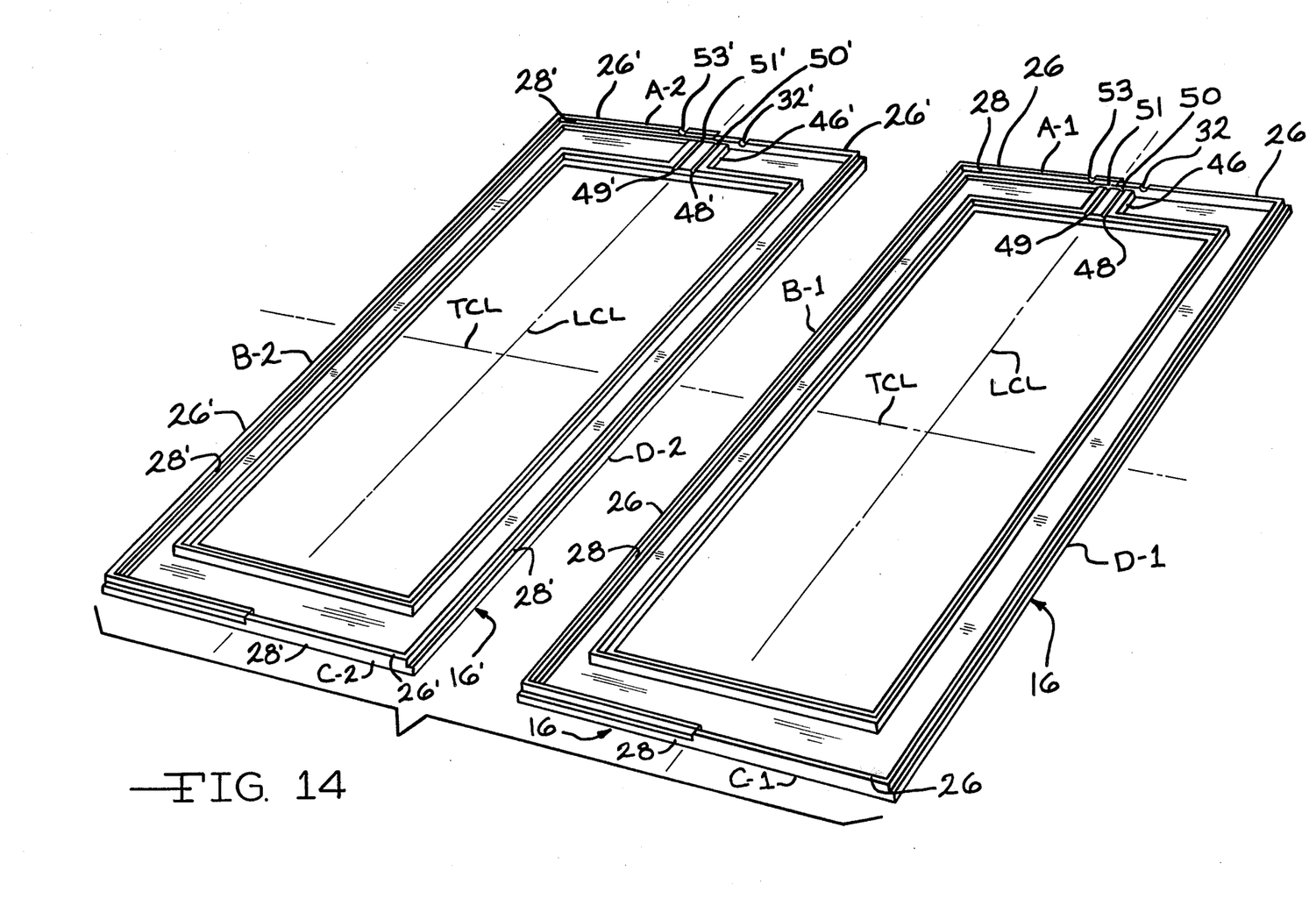

Referring now to FIG. 14, there is shown another embodiment in which the wall 46 of skin 16 is positioned along the side A-1 with its center being aligned with the longitudinal center line LCL. The apertures 50, 51, 52 and 53 are also positioned along side A-1 in similar relationship to the wall 46 as in the previous embodiment.

As shown in FIG. 14, under this embodiment, it is possible to have the notches 28, 28' of the flanges 26, 26' along side D-1, D-2 on the exterior surface for the entire length of the respective flanges 26, 26' from ends A-1, A-2 to ends C-1, C-2. In this event, the notches 28, 28' of flanges 26, 26' along sides B-1, B-2 are on the interior surface for the entire length of the flange 26, 26' from end A-1, A-2 to end C-1, C-2.

The second skin 16' is identical as molded. In this embodiment, it is not necessary to turn the second skin 16' end to end prior to turning it over about the longitudinal centerline LCL in order to join it to the first skin 16. Rather it is simply necessary to turn it over about such centerline LCL. Thus, under this embodiment, the sides would be joined as follows: A-2 to A-1, B-2 to D-1, C-2 to C-1 and D-2 to B-1.

Alternatively, under this embodiment, it would be possible to have the notches 28, 28' of the flanges 26, 26' along the side D-1, D-2 on the exterior surface from the transverse centerline TCL to the end A-1, A-2 and on the interior surface from such centerline TCL to the end C-1, C-2 and the notches 28, 28' of the flanges 26, 26' along the side B-1, B-2 on the exterior surface from the transverse centerline TCL to the end C-1, C-2 and on the interior surface from such centerline TCL to the end A-1, A-2.

Referring now to FIG. 4, there is shown an embodiment in which a single pane of glass 36' is provided for the central panel. In this embodiment, an L-shaped spacer 64 is positioned with one leg abutting the interior surface of the lip 34 and the other leg extending across the gap to hold the glass pane 36' against the opposite lip 34'. The L-shaped spacer 64 cooperates with the wall formed by the abutting second flanges 30, 30' and with the surface of the glass pane 36' to form a cavity 66 into which the polyisobutylene or other sealant may be introduced. The sealant, by virtue of the pressure under which it is introduced will wick around the end and opposite surface of the glass and around the end of the L-shaped spacer 64 to form a firm seal with the inner surfaces of the respective lips 34, 34' as well as the wall formed by the respective second flanges 30, 30'.

Referring now to FIG. 5, there is shown an embodiment in which three panes of glass 36" may be utilized. This embodiment utilizes a dessicant holder similar to that shown in FIG. 3 but of smaller size so that the three panes and the dessicant holder can fit within the space defined by the opposing lips 34, 34'.

For some applications, it may be satisfactory to have a butt joint between the flanges 26, 26' similar to the butt joint between the second flanges 30, 30'. In that event, the flanges 26, 26' will be the same height as the second flanges 30, 30' and it will not be necessary that they be formed with a notch.

Having thus described the invention in detail, it should be understood that various modifications and changes may be made in the invention without departing from the scope and spirit of the claims. Other materials including transparent plastics such as Plexiglas may be used as the central panel material instead of glass. In addition, opaque or translucent material as well as reinforced materials may be used for the central panel materials.

Variations may also be made in actual form of the skins and the frame assembly can be of a size and function used for a window rather than a door.

I claim:

1. An improved frame assembly for doors, windows and the like comprising:
 a frame having an exterior periphery defining first, second, third and fourth edges, the first and third edges being opposite and the second and fourth edges being opposite and having interior edges defining an opening for receiving and retaining a central panel, a central panel positioned within said frame, said central panel defining an edge about its exterior periphery, and frame including a first skin and a second skin in opposed relationship, each of said skins having substantially identical configuration as molded and each of said skins having an exterior edge, a panel portion extending from said exterior edge to a lip terminating at said interior edge, the lips of the respective first and second skins cooperating to define a gap in which the edge of the central panel is positioned, the exterior edges of each skin having first, second, third and fourth exterior flanges depending therefrom and extending inwardly toward the opposing skin, said exterior flanges being joined together to form the first, second, third and fourth edges of said frame, the terminal portion of each of said exterior flanges having at least one notch, said notches being on the exterior faces of said exterior flanges around half of said exterior periphery and on the interior faces around the remainder of said exterior periphery, the dividing points between the notches being on the interior face and on the exterior face being at the mid-points of at least one set of opposing exterior flanges forming (1) the first and third edges and (2) the second and fourth edges, the respective exterior flanges of the upper and lower skins joined together at their respective notches to form a lap joint around said exterior periphery, said skins each having a second inwardly facing flange spaced exteriorally from said interior edges, said second flanges abutting each other and cooperating with the joined exterior flanges and opposed panel portions to form a cavity, and sealant means for sealing the central panel between the lips defining said gap and the abutting second flanges.

2. An improved frame assembly according to claim 1, further including insulating material in said cavity.

3. An improved frame assembly according to claim 1, wherein each of said skins has a lateral wall extending between one of its exterior flanges and its second flange at a mid-point forming one of said dividing points, the lateral wall of the respective skins cooperating when the skins are joined to form a dam across said cavity, and passage means through said exterior and second flanges and said dam for introducing sealant to seal the central panel.

4. An improved frame assembly according to claim 1, wherein said first, second, third and fourth exterior flanges as molded have notches on the interior face extending from the mid-point of the first flange to the mid-point of the second flange and on the interior face from the mid-point of the third flange to the mid-point of the fourth flange.

5. An improved frame assembly according to claim 1, wherein said first, second, third and fourth exterior flanges as molded have notches on the interior face extending from the mid-point of the first flange to the end adjacent the second flange, on the interior face extending from the mid-point of the third flange to the end adjacent the fourth flange and on the interior face on one of the second or fourth flanges.

6. An improved frame assembly according to claim 1, wherein said central panel member includes a single pane of material, a holder supporting the single pane between said lips and a sealant in the unoccupied portions of said gap to adhere the edge portion of said pane with the respective skins.

7. An improved frame assembly according to claims 1, 2 or 3, wherein said dividing points are at the mid-points of both of said set (1) forming the first and third edges and said set (2) forming the second and fourth edges.

8. An improved frame assembly according to claim 1, 2 or 3, wherein said dividing points are at the mid-points of one of said set (1) forming the first and third edges or said set (2) forming the second and fourth edges, each of the exterior flanges of a skin in the other of said sets having a notch on its interior face for the full length of one edge and on its exterior face for the full length of the other edge.

9. An improved frame assembly according to claim 2, wherein said central panel includes a plurality of spaced apart parallel sheets of glass and further including second sealing means positioned between said sheets of glass adjacent the periphery thereof, said second sealing means including gasket means in sealing engagement with the inner surface of each of said sheets of glass, dessicant means communicating with the space between said sheets of glass, said dessicant means and said gasket means spaced from and cooperating with the abutting second flanges and the lips to define a second cavity, sealant means in said second cavity and passageway means from the inwardly facing flanges of said exterior edges to the second cavity for introducing sealant means thereto.

10. An improved frame assembly according to claim 2, wherein said central panel member includes multiple panes of glass in spaced parallel relationship, second sealing means positioned between said panes of glass adjacent to but spaced from the edge defining the exterior periphery of the panes of glass, the sealant means being flowed into the unoccupied portions of said gap to adhere the edge portions of said central panel member with the respective skins and the second sealing means.

11. An improved frame assembly according to claim 10, further including a holder positioned between said panes of glass adjacent to but spaced from the exterior periphery of said panes of glass, dessicant means within said holder, and aperture means in the holder permitting communication between the dessicant means and the space between said panes of glass, said second sealing means including a pair of strips, one positioned on each side of said holder, one in contact with each of the panes of glass.

12. An improved frame assembly according to claim 3, wherein said passage means comprises an inlet passage on one side of said mid-point and an outlet passage on the other side of said mid-point and equidistant therefrom.

13. An improved frame assembly for doors, windows and the like comprising:

(i) a rectangular frame having exterior edges defining four sides and interior edges spaced apart from said exterior edges, said interior edges defining an opening for receiving and retaining a central panel, said frame including a first skin and a second skin in opposed relationship, the first skin as molded having substantially identical configuration as the second, each of said skins including:

(a) an exterior edge having a flange facing inwardly toward the opposing skin, the terminal portion of said flange having one or more notches on each of four sides of the rectangle defined by said flange, the first and third sides being parallel to each other and the second and fourth sides being parallel to each other, one of said notches being on the exterior face of the flange defining the first side of said rectangle from the center of such side to the end adjacent the second side and another notch on the interior face of the flange defining the first side from said center to the end adjacent the fourth side, the opposite and parallel flange forming the third side having a notch on its exterior face from the center of such side to the end adjacent the fourth side and a notch on its interior face from the center to the end adjacent the second side, the flanges forming the second and fourth sides of the rectangle having notches formed on their exterior and interior faces such that the flanges from the second skin and when joined together with the first skin form a lap joint, (b) a panel portion extending from said exterior edges to a lip terminating at said interior edges;

(c) a second flange spaced between the exterior edge flange and the lip and extending inwardly toward the opposing skin, said second flanges abutting each other and cooperating with the joined exterior edge flanges and the panel portion of said skins to form a cavity, (d) a lateral wall extending between said exterior edge flange and the second flange at the center of the first of the sides defining said rectangle, said lateral wall abutting the lateral wall of the opposing skin when the skins are joined and having passageway means extending from the exterior edge to a point aligned with said lips for introducing sealing means, (ii) a central panel positioned within said opening with its edge extending into the space between said lips, (iii) means for sealing the central panel between said lips, and (iv) insulating material in said cavity.

14. An improved frame assembly according to claim 13, wherein the exterior edge flange of a skin forming the second side of the rectangle has a notch across the full length of its exterior face and the exterior edge flange forming the fourth side of the rectangle has a notch across the full length of its interior face.

15. An improved frame assembly according to claim 13, wherein the exterior edge flange of a skin forming the second side of the rectangle has a notch on its exterior face from its end adjacent the first side to its center and on its interior face from its center to its end adjacent the third side and the exterior edge flange forming the fourth side of the rectangle has a notch on its exterior face from its center to its end adjacent the third side and on its interior face from its center to its end adjacent the first side.

16. An improved frame assembly according to claim 13, wherein said central panel includes a plurality of spaced apart parallel sheets of glass and further including second sealing means positioned between said sheets of glass adjacent the periphery thereof, said second sealing means including gasket means in sealing engagement with the inner surface of each of said sheets of glass, dessicant means communicating with the space between said sheets of glass, said dessicant means and said gasket means spaced from and cooperating with the abutting second flanges and the lips to define a second cavity, in which said sealing means is located.

17. An improved frame assembly according to claim 13, wherein said central panel member includes a single pane of material, a holder supporting the single pane between said lips and a sealant in the unoccupied portions of said gap to adhere the edge portion of said pane with the respective skins.

18. An improved frame assembly according to claim 13 wherein said passageway means comprises an inlet passage on one side of said center and an outlet passage on the other side of said center and equidistant therefrom.

19. An improved frame assembly according to claim 13, wherein said central panel member includes multiple panes of glass in spaced parallel relationship, second sealing means positioned between said panes of glass adjacent to but spaced from the edge defining the exterior periphery of the panes of glass, said means for sealing the central panel being flowed into the unoccupied portions of the space between said lips to adhere the edge portions of said central panel member with the respective skins and the second sealing means between the panes of glass.

20. An improved frame assembly according to claim 19, further including a holder positioned between said panes of glass adjacent to but spaced from the exterior periphery of said panes of glass, dessicant means within said holder, and aperture means in the holder permitting communication between the dessicant means and the space between said panes of glass, said second sealing means including a pair of strips, one positioned on each side of said holder, one in contact with each of the panes of glass.

21. An improved frame assembly for doors, windows and the like comprising:

(i) a rectangular frame having exterior edges defining four sides and interior edges spaced apart from said exterior edges, said interior edges defining an opening for receiving and retaining a central panel, said frame including a first skin and a second skin in opposed relationship, the first skin as molded having substantially identical configuration as the second, each of said skins including:

(a) an exterior edge having a flange facing inwardly toward the opposing skin, the exterior edge flanges of the second skin joined together with the exterior edge flanges of the first skin to form the exterior edges of said frames, (b) a panel portion extending from said exterior edges to a lip terminating at said interior edges;

(c) a second flange spaced from the exterior edge flange and extending inwardly toward the opposing skin, said second flanges abutting each other and cooperating with the joined exterior edge flanges and the panel portion of said skins to form a cavity, (d) a lateral wall extending between said exterior edge flange and the second flange at the center of one of the sides defining said rectangle, said lateral wall abutting the lateral wall of the opposing skin when the skins are joined and having passageway means extending from the exterior edge to a point aligned with said lips, (ii) a central panel positioned within said opening with its edge extending into the space between said lips, (iii) means for sealing the central panel between said lips, and (iv) insulating material in said cavity.

22. For use in an improved assembly for doors, windows and the like, a skin member comprising a panel portion having first, second, third and fourth exterior edges, the first and third edges being opposite and the second and fourth edges being opposite, said panel portion extending to a lip having an interior edge and defining an opening, each of said exterior edges having flanges depending therefrom, the terminal portion of each of said flanges having a notch on its exterior face around half its periphery and a notch on its interior face around the remainder of its periphery, the dividing points between the notches being on the interior face and on the exterior face being at the mid-point of at least one set of opposite flanges depending from (1) the first and third exterior edges or (2) the second and fourth exterior edges, a second flange depending from said panel portion exteriorly from said interior edges and cooperating with said exterior edge flanges to form a channel.

23. A skin member according to claim 22, wherein said skin has a lateral wall extending between one of its exterior edge flanges and its second flange at a mid-point forming one of said dividing points, and lateral passage means through said one of the exterior edge flanges and said lateral wall.

24. A skin member according to claim 23, wherein the said exterior edge flanges have notches on the interior face extending from the mid-point of the first edge to the mid-point of the second edge and from the mid-point of the third edge to the mid-point of the fourth edge and have notches on the exterior face extending from the mid-point of the first edge to the mid-point of the fourth edge and from the mid-point of the third edge to the mid-point of the second edge.

25. A skin member according to claim 23, wherein the exterior edge flanges have notches on the interior face extending from the mid-point of the first edge to the end adjacent the second edge, on the interior face extending from the mid-point of the third edge to the end adjacent the fourth edge and on the interior face on one of the flanges depending from the second or fourth edges.

26. A skin member according to claims 23, 24 or 25 wherein said lateral passage means comprises an inlet passage on one side of said mid-point and an outlet passage on the other side of said mid-point and equidistant therefrom.

* * * * *